12,484,404
**STABILISATION OF SOLUTIONS OF POLY-
URETHANE POLYMERS**
Georges Collardeau, Saint-Fons, Rhone, and Yves Bonin,
Lyon, France, assignors to Rhone-Poulenc S.A., Paris,
France, a French body corporate
No Drawing. Filed Dec. 19, 1966, Ser. No. 602,594
Claims priority, application France, Dec. 31, 1965,
44,501
Int. Cl. C08g 41/00
U.S. Cl. 260—32.6                                    2 Claims

ABSTRACT OF THE DISCLOSURE

Dimethylformamide having certain betaine salts dissolved therein is an excellent solvent for polyester-polyurea-polyurethanes.

---

The present invention relates to the stabilisation of solutions of polyurethane polymers, more especially solutions of polyurea-polyurethanes, in dimethylformamide.

The viscosity of solutions of polyurea-polyurethanes in dimethylformamide increases with time. At ambient temperature (about 20° C.) it rises relatively rapidly, and the solutions finally become gels which cannot be converted into shaped articles, especially filaments, fibres and sheets.

It has now been found that the stability of solutions of polyurea-polyurethanes in dimethylformamide may be increased by adding to them a betaine salt which is soluble in dimethylformamide. Solutions stabilised in this way may be stored at least 3 to 4 times longer before use than unstabilised solutions.

Suitable polyurea-polyurethanes are, e.g., those used in the manufacture of elastic articles. Such polyurea-polyurethanes may, for example, be obtained by reacting a polyester or a linear polyether having a hydroxyl group at each end of the chain with a diisocyanate so as to obtain a macrodiisocyanate which is then reacted with a diamine or with hydrazine.

The starting polyesters are linear products having molecular weights which are generally between 500 and 2500, and which result from the polycondensation of aliphatic and/or cyclic dicarboxylic acids with aliphatic and/or cyclic diols, such as ethylene glycol polyadipates. The polyethers are products of the polycondensation or copolymerisation of olefine oxides such as ethylene oxide, propylene oxide or tetrahydrofuran.

The diisocyanates which are reacted with these macrodiols may be aliphatic, cycloaliphatic or aromatic. They include, for example, 1,6-diisocyanato-hexane, 4,4'-diisocyanato-diphenylmethane, the isomeric diisocyanato-toluenes, the diisocyanatonaphthalenes, and p,p'-diisocyanato-ditolylurea.

The coupling reagents used are usually compounds containing two —NHR groups (where R may be hydrogen or a hydrocarbon radical) for example hydrazine, ethylene diamine, propylene diamine, 1,4-diaminocyclohexane, p,p'-diaminodiphenylmethane, the xylylene diamines, and ortho-dichlorobenzidine.

Suitable betaine salts which are soluble in dimethylformamide include salts with strong mineral acids and organic carboxylic acids, e.g. betaine citrate, ascorbate, bisulphate, tartrate and salicylate.

The betaine salt may be added to the polymer solution during its manufacture, or to the finished polymer either in the solid state or after it has been dissolved in dimethylformamide.

The amount of betaine salt to be added to the polyurea-polyurethane solutions in dimethylformamide to stabilise them may vary between rather wide limits, the optimum amount depending on various factors such as the polymer concentration and the temperature. In general, an amount of 0.5 to 5% by weight based on the weight of dry polymer is very suitable. The concentration of the polymer in the solution is ordinarily 10 to 50% by weight.

The polyurea-polyurethane solutions in dimethylformamide may contain various fillers, e.g. matting agents such as, for example, zinc oxide.

The following examples illustrate the invention. The viscosities given are determined by the method described in the standard specification entitled "British standard method for the determination of viscosity in absolute units" of the "British Standards Institution," leaflet No. 188 (1937 edition); this method consists of measuring the time required by a ball to travel under gravity, inside a tube filled with the substance to be examined, the distance between two reference points marked on this tube.

EXAMPLE 1

170 g. of a polyadipate of ethylene glycol and propylene glycol, of molecular weight 1700, having an hydroxyl group at each end of the chain, and having a molar ratio ethylene glycol/propylene glycol of 4, are dissolved in 104 g. of dry toluene. 50 g. (0.2 mol) of 4,4'-diisocyanato-diphenylmethane dissolved in 50 g. of toluene containing 0.3 g. of terephthaloyl chloride are added to this solution, and the mixture then heated under reflux for 3 hours 30 minutes. 44 g. of the solution so obtained are then withdrawn and diluted with 73 cm.$^3$ of dimethylformamide, and a solution of 0.0118 mol of hydrazine in 39 cm.$^3$ of dimethylformamide are then added. A polymer solution is thus obtained which has a viscosity from 20 to 40 poises at 25° C., and its concentration is brought to 28% solids by distillation at 40° C., under reduced pressure. The resulting solution is then divided into 6 equal fractions, numbered 1, 2, 3, 4, 5 and 6. Five of these are stabilised by adding 2% of various betaine salts which are soluble in dimethylformamide; the sixth fraction serves as a control. The time at 25° C. for setting to a gel is measured for each fraction; the solutions are considered to have set to gels when it is no longer possible to measure their visosity by the method indicated above.

The results obtained are as follows:

| Fraction | Stabiliser used [1] | Time for setting to a gel (days) |
|---|---|---|
| 1 | 2% of betaine citrate | 15 |
| 2 | 2% of betaine bisulphate | 13 |
| 3 | 2% of betaine ascorbate | 14 |
| 4 | 2% of betaine tartrate | 16 |
| 5 | 2% of betaine salicylate | 14 |
| 6 | Control | 4 |

[1] Percentages expressed by weight based on the weight of the polymer dissolved.

This table shows that only the solutions which are stabilised by a betaine salt which is soluble in dimethylformamide have a storage time which allows them to be used in a practical manner.

EXAMPLE 2

The mode of operation is identical to that of the preceding example, with the hydrazine being replaced by the corresponding amount (0.0118 mol) of meta-xylylene diamine. The polymer obtained after concentration in vacuo is divided into two parts. 1.8% of betaine citrate is added to the first part whilst the second part serves as a control. The time required for gelling is one and a half days in the case of the control, whilst it is 9 days for the stabilised fraction.

EXAMPLE 3

The mode of operation is as in Example 1 except that the 4,4'-diisocyanato-diphenylmethane is replaced by 2,4-diisocyanatotoluene and the hydrazine by ethylene diamine. The polymer obtained after concentration in vacuo is divided into two parts. 1.8% of betaine citrate is added to the first part whilst the second part serves as a control. The time for gelling of the reference standard is 8 days. The stabilised fraction, of viscosity 353 poises at 25° C., still has not gelled after 15 days storage, its viscosity then being 378 poises.

We claim:

1. A solution of a polyurea-polyurethane formed by reacting a linear hydroxyl-terminated polyester of molecular weight between 500 and 2500 with an organic diisocyanate to produce a macrodiisocyanate and reacting said macrodiisocyanate with a member selected from the group consisting of diamines and hydrazine in dimethylformamide having a betaine salt selected from the group consisting of citrate, bisulfate, ascorbate, tartrate and salicylate dissolved therein, the proportion of the betaine salt being 0.5 to 5% of the weight of said polyurea-polyurethane.

2. A solution according to claim 1 in which the concentration of the polyurea-polyurethane is 10 to 50% by weight.

References Cited

UNITED STATES PATENTS 3,005,793  10/1961  Wagner _____ 260—31.2
3,097,192  7/1963  Schilit.

MORRIS LIEBMAN, Primary Examiner

H. H. FLETCHER, Assistant Examiner

U.S. Cl. X.R.

260—45.85, 77.5